(12) United States Patent
Maier et al.

(10) Patent No.: US 8,942,851 B1
(45) Date of Patent: Jan. 27, 2015

(54) TALON ROBOT INTEGRATED ACCESSORY DEVICE

(71) Applicants: Gregory Maier, Flanders, NJ (US); Joshua Lee, Pine Brook, NJ (US); Michael Freeman, Pompton Lakes, NJ (US)

(72) Inventors: Gregory Maier, Flanders, NJ (US); Joshua Lee, Pine Brook, NJ (US); Michael Freeman, Pompton Lakes, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 154 days.

(21) Appl. No.: 13/788,543

(22) Filed: Mar. 7, 2013

(51) Int. Cl.
*G05B 15/00* (2006.01)
*B25J 13/00* (2006.01)

(52) U.S. Cl.
CPC ............... *B25J 13/00* (2013.01); *Y10S 901/47* (2013.01)
USPC .............................. 700/259; 700/245; 901/47

(58) Field of Classification Search
USPC .................................................. 700/245–264
See application file for complete search history.

(56) References Cited

U.S. PATENT DOCUMENTS 8,768,509 B2 * 7/2014 Unsworth ..................... 700/245

* cited by examiner

*Primary Examiner* — Bhavesh V Amin
(74) *Attorney, Agent, or Firm* — Michael C. Sachs

(57) ABSTRACT

A device which permits two additional tools to be attached to the robot arm of a Talon® robot with remote operation of these same tools, from the existing operator control unit. The invention permits an operator to merely carry two tools down range while preserving full use of the robot's gripper, and then allow an operator to remotely use those two tools. These do not increase the amount of space the robot occupies, and still allow for continued use of existing equipment.

11 Claims, 2 Drawing Sheets

TALON ROBOT INTEGRATED ACCESSORY DEVICE

U.S. GOVERNMENT INTEREST

The inventions described herein may be made, used, or licensed by or for the U.S. Government for U.S. Government purposes.

BACKGROUND OF INVENTION

This invention deals with improving the tools capabilities of robots such as the TALON® used in, e.g., approaching, examining and manipulating IED's (improvised explosive devices) on a battlefield. A MTRS (Man Transportable Robotic Systems) program included fielding of the Mk1 PackBot® and Mk2 TALON® robots for these purposes. These tasks generally required use of multiple tools down range such as a knife, wire tracer, shovel, and a spear, etc. Currently fielded MTRS robotic systems have two main deficiencies that make the use of such tools very difficult. Firstly, the MTRS robotics systems lack the electrical and mechanical interfaces for remote operation of these tools. Secondly, the MTRS robotic systems lack fixtures on which to mount such tools while preserving full usage of the robot's gripper. Because of these deficiencies, if an operator wishes to use the robot to bring multiple tools to an incident site, he must drive the robot back to the truck, grasp the tool he needs with the gripper, and then drive the robot back to the IED site. This procedure dramatically increases the robot operator's time on target, exposing him to enemy fire. Furthermore, all this driving of the robot drains the robot's battery and vastly reduces the robot's operation time.

Three different solutions were previously developed to solve this problem. The first solution was the MTRS Hand Tool Kit, which is an approved accessory for both the Mk1 PackBot and Mk2 TALON robots. The kit consists of a universal interface block to be held in the Mk1 and Mk2 robot grippers. The interface block holds up to three different tools at a time, with tools such as a knife, wire tracer, shovel, or a spear, etc. The MTRS Hand Tool Kit was unsatisfactory because the interface block eliminates gripper function. In order to use tools as well as the gripper, the robot operator must drop the block to make the gripper available to use, and then must remotely pick the block back up later. This adds a significant amount of time and cognitive burden for the operator.

A second solution was the Automatic Robotic Tool Changer for the MTRS Mk1 PackBot by Stratom, Inc. This tool changer is specifically designed only for the Mk1 PackBat, and is not usable with the Mk2 TALON, due to the different nature of these two robot systems. A third solution was the Small Robot Toolkit system by RE2. This toolkit is specifically designed only for the Remotec Inc.'s HD-1 robot system, and is not applicable to either the MTRS Mk1 PackBot or the MTRS Mk2 TALON.

The tool changers designed by Stratom, Inc. and by RE2, Inc. both were considered to have the following drawbacks: First, a rack to hold the tools must be mounted on the back of the robot. The presence of this rack degrades the robot's mobility. It also increases the amount of space required for storage of the platform, and storage space is very limited in military vehicles. Second, these tool changers require the design of semi-autonomous procedures to allow the robot arm to fetch and replace tools from the tool rack. This adds complexity to the robot, and if these procedures malfunction, the tool might be dropped, and the robot arm could be left with no appendage on its end. Third, installation of these systems into the robot requires modification of the robot's gripper-to-arm interface. This modification requires depot level upgrades to the robot's hardware and software. Fourth, because the robot's gripper must be removed in order to install a tool onto the robot's arm, the gripper is unavailable for use when a tool is employed. Fifth, with these systems, the position of the tool is controlled by positioning the robot's arm. The precision of this positioning is limited by how precisely the robot's arm can be controlled.

BRIEF SUMMARY OF INVENTION

This invention will allow an operator to merely carry two tools down range while preserving full use of the robot's gripper, and then allow an operator to remotely use those two tools. This invention provides a fully integrated, remotely operated tool capability on an MTRS Mk2 TALON robot. Mounted on the robot arm, the TALON Robot Integrated Accessory Device (TRIAD) enables remote operation of two tool holders for the MTRS Mk2 TALON and TALON 3B robots without increasing the amount of space the robot occupies. TRIAD grants the operator quick deployment and stowage capability without interfering or eliminating the gripper, ease of installation, and plug-and-play integration that requires no software installation, hardware modification, or additional controller. Also, TRIAD gives additional flexibility to the limited robot arm reach and angle, and allows more precise control of the tool's orientation than the robot's arm presently would allow. This invention also is interoperable with existing tools from the MTRS Hand Tool kit and this allows continued use of currently deployed equipment.

OBJECTS OF THE INVENTION

Accordingly, it is an object of the present invention to provide means which permits two additional tools to be attached to the robot arm of a Talon robot for remote operation of these tools from the existing operator control unit.

Another object of the present invention is to permit a Talon operator to merely carry two tools down range while preserving full use of the robot's gripper, and then allow an operator to remotely use those two tools.

It is a further object of the present invention to not increase the amount of space a Talon robot occupies, and still allow for continued use of current equipment.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

DETAILED DESCRIPTION

Figure 1:
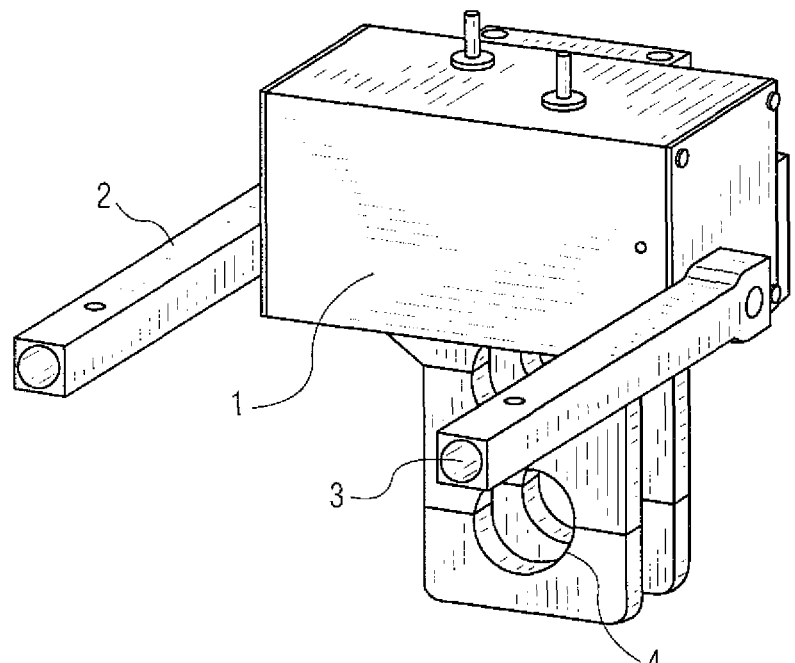
FIG. 1 shows a front view of the main body of the invention, having two tool holders attached, and a below interface piece, all according to this invention.
Figure 2:
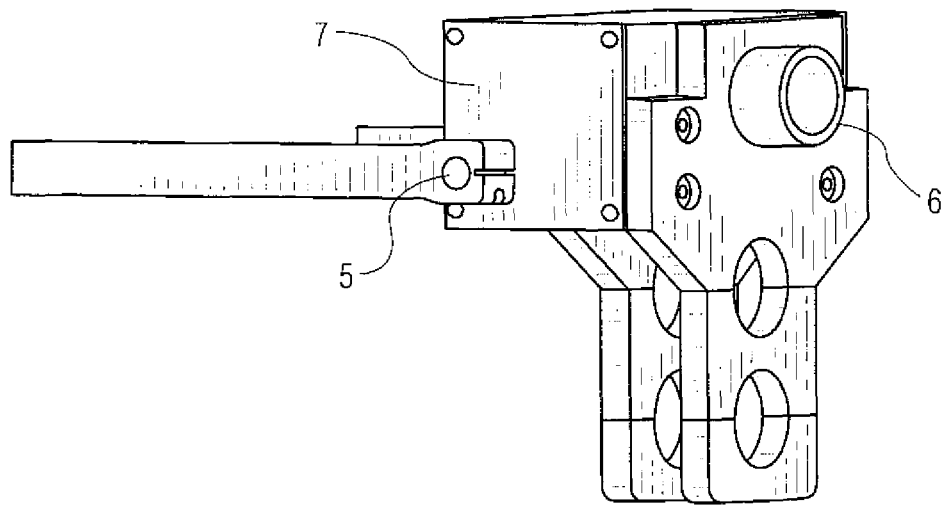
FIG. 2 shows a rear and end plate view of the main body of the invention, having one tool holder in view, further showing rear connector conduit, according to this invention.
Figure 3:
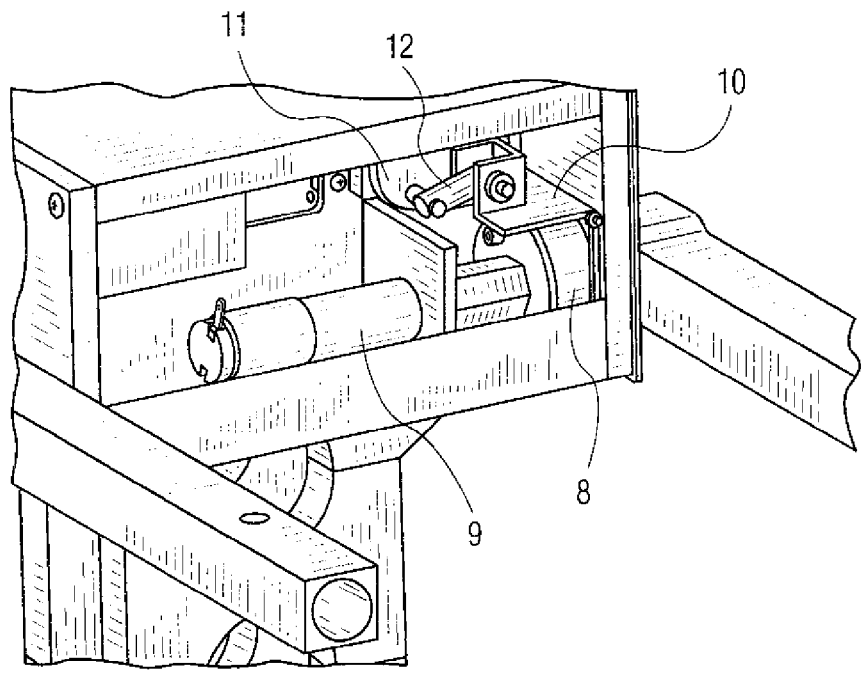
FIG. 3 shows a rear, opened up view of the main body of the invention, showing locking and driving mechanisms for the tool holders according to this invention.

The system, shown in FIGS. 1-4, is comprised of a main body (1), a pair of remotely movable tool holders (2) with its tool interface (3) to the MTRS Hand Tool Kit, an interface to the robot arm and gripper (4), and camera mount and connector conduit (6). The main body (1) houses electronic circuit boards (not shown), the drive motor (9), and the locking mechanism (7, 8, 10, 11, and 12). The electronic circuit boards in the main body (1) capture the command and control signals from the robot system, which is controlled by the existing operator control unit, and power the drive motor (9) for tool holder rotation. The locking mechanism (7, 8, 10, 11, and 12) locks the tool holders in position and allows them to withstand any loads that would be encountered during robot operation. The locking mechanism consists of the release servo motor (11), the push rod (12), the release fork (10), the shaft lock (8), and the end plate (7). The shaft lock (8) is comprised of six spring-loaded pins. When the lock engages, two of the pins will engage with (the inside surface of) end plate (7), which locks the tool holders in position. The release servo motors (11) initiate the process of engaging and disengaging the shaft lock (8) from the end plate (7). When the release servo motors (11) push the push rod (12), it lifts the release fork (10) and disengages shaft lock (8) from the end plate (7), at which time the drive motor (9) becomes free to rotate the tool holder(s). The tool holders (2) were designed to have an interface to adapt tools from the MTRS Hand Tool Kit, and the drive shaft (5) is the pivot point for the tool holder rotation. The interface to the robot arm and gripper (4) is to be used to install the system on an MTRS Mk2 TALON robot or an TALON 3B robot. The camera mount and connector conduit (6) provide cable assembly for electrical interfaces to an MTRS Mk2 TALON through the robot gripper camera and the robot gripper motor connectors. This cable assembly is to be used for capturing control signals and redirecting the robot gripper motor control signal to the drive motors (9) for rotating the tool holders. The tool holders are mounted using the interface to the robot gripper and robot arm (4). When the operator control unit sends camera control signals, the electronic circuit boards in the main body capture those signals through the camera mount and connector conduit (6) and then disengage shaft lock (8) from the end plate (7) by rotating the servo motor which pushes push rod (12) and release fork (10). Disengaging the lock mechanism frees the tool holders for rotation around drive shaft (5). Then, the gripper motor control signal will be redirected to control the drive motor (9) for its forward and the reverse rotation. A camera control signal will designate which tool holder (the right or the left) will be controlled.

Figure 4:
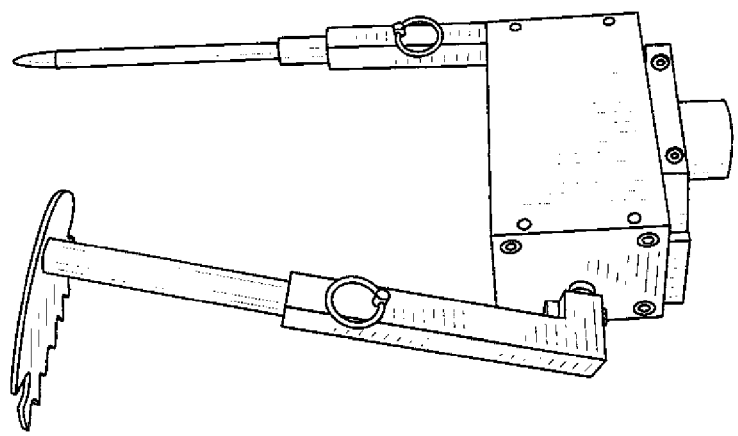
FIG. 4 shows a photograph of the invention with two tools attached according to this invention.

FIG. 4 shows a photograph of the invention with two tools attached (a shoveling type tool and a spearing type tool).

While the invention may have been described with reference to certain embodiments, numerous changes, alterations and modifications to the described embodiments are possible without departing from the spirit and scope of the invention as defined in the appended claims, and equivalents thereof.

What is claimed is:

1. A system for enabling two additional tools to be attached to the robot arm of a Talon robot with remote operation of said tools, said system comprising:

a main body (1), a pair of remotely movable tool holders (2), each with its tool interface (3); a mounting interface (4), a camera mount and connector conduit (6), said main body further housing a drive motor (9), a drive shaft (5) connected to said tool holders, a locking mechanism which includes push rod (12), release fork (10), a shaft lock (8) including six spring-loaded pins two of which pins engage an end plate (7) which locks the tool holders in position, a release servo motor (11) which initiates engagement and disengagement of the shaft lock with the end plate, wherein when the release servo motor pushes the push rod, such lifts the release fork and disengages the shaft lock from the end plate thereby enabling the drive motor to rotate the tool holders around the drive shaft; and, camera control signals in the operator control unit control electronic circuit boards in the main body through said camera mount and connector conduit to disengage the shaft lock from the end plate by rotating the servo motor, such disengaging the push rod and release fork, this permitting rotation of the tool holders around the drive shaft, then motor control signals to the gripper will be redirected to forward and reverse rotate the drive motor, and a camera control signal will designate which tool holder is to be controlled.

2. A system for enabling up to two additional tools to be attached to the robot arm of a Talon robot, and operated remotely, said system comprising:

a main body mounted to said robot comprising a pair of movable tool holders each having a tool interface; signal connector means on said main body, said main body having means to drive either movable tool holder and lock such tool holders in place.

3. The system of claim 2 wherein the tools include a knife, a wire tracer, a shovel, and a spear.

4. The system of claim 3 wherein signals may be sent from a remote operator control unit of said Talon robot, to remotely control said movable tool holders on said robot main body.

5. The system of claim 4 wherein said signals are received in said signal connector means on said robot main body.

6. The system of claim 5 wherein said main body further includes a drive motor and a drive shaft which is connected to said tool holders.

7. The system of claim 6 wherein said main body has a locking mechanism.

8. The system of claim 7 wherein said locking mechanism includes within said main body: a push rod, a release fork, and a shaft lock which locks the tool holders in position.

9. The system of claim 8 wherein the shaft lock includes six spring-loaded pins two of which pins engage an end plate on said main body.

10. The system of claim 9 wherein said locking mechanism further includes a release servo motor which initiates engagement and disengagement of the shaft lock with the end plate, wherein when the release servo motor pushes the push rod, such lifts the release fork and disengages the shaft lock from the end plate thereby enabling the drive motor to rotate the tool holders around the drive shaft.

11. The system of claim 10 wherein camera control signals in a remote operator control unit control electronic circuit boards in the main body through said signal connector means to disengage the shaft lock from the end plate by rotating the servo motor, such then disengaging the push rod and release fork this permitting rotation of the tool holders around the drive shaft, then motor control signals to the gripper will be redirected to forward and reverse rotate the drive motor, and a camera control signal will designate which tool holder is to be controlled.

* * * * *